Figure 1:
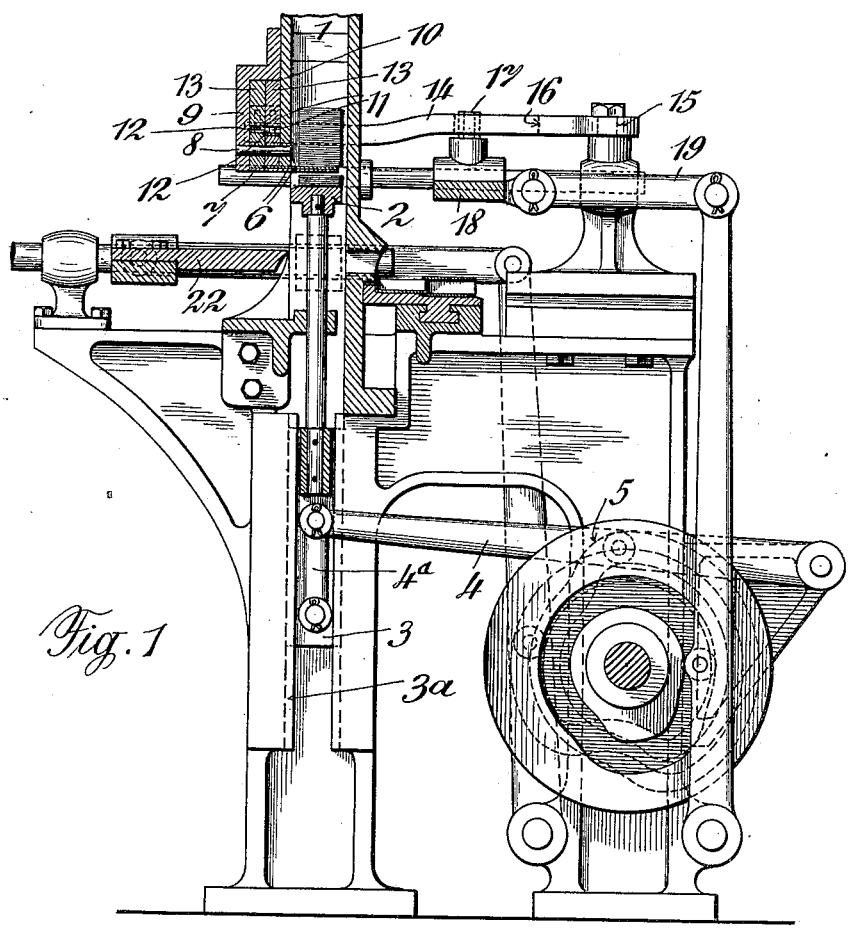

H. A. GSELL.
APPARATUS FOR MEASURING OFF MATCHES FOR MACHINES FOR PACKING MATCHES IN BOXES.
APPLICATION FILED DEC. 5, 1913.

1,096,299.

Patented May 12, 1914.

3 SHEETS—SHEET 1.

Witnesses:

Inventor:
Henry Alfred Gsell.
By
Atty.

H. A. GSELL.
APPARATUS FOR MEASURING OFF MATCHES FOR MACHINES FOR PACKING MATCHES IN BOXES.
APPLICATION FILED DEC. 5, 1913.
1,096,299.
Patented May 12, 1914.
3 SHEETS—SHEET 2.
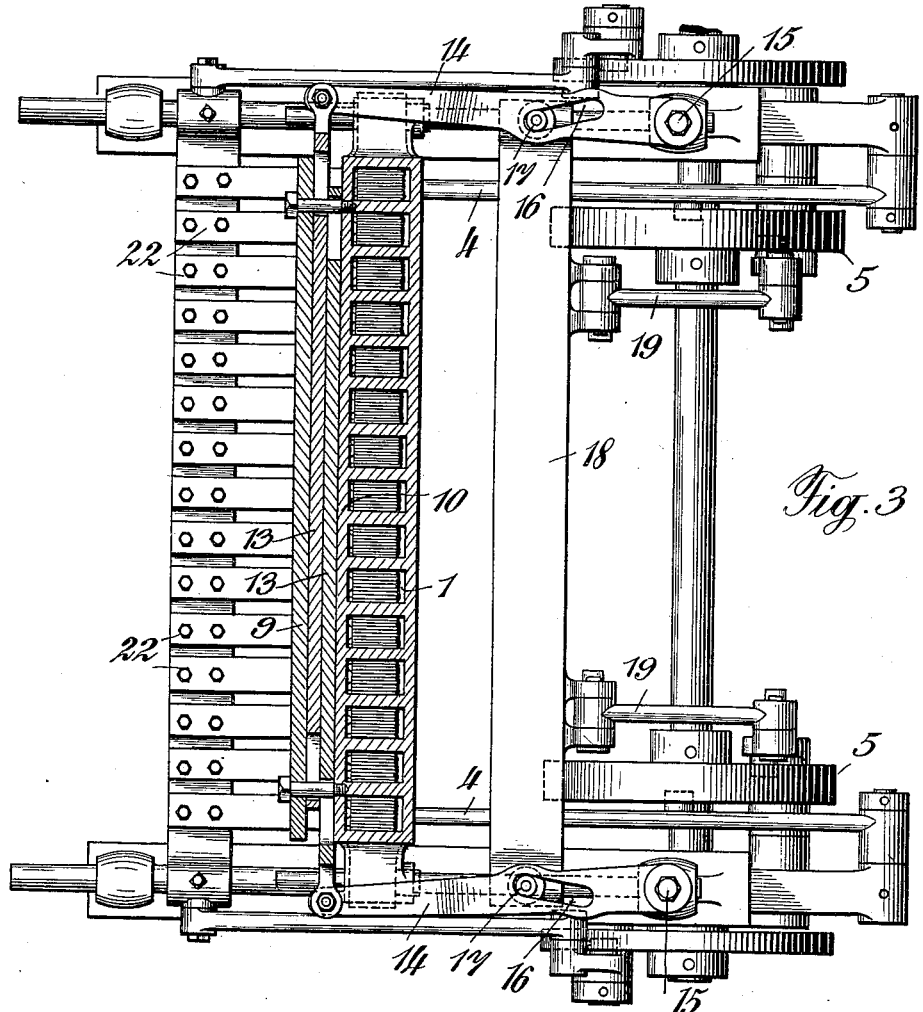
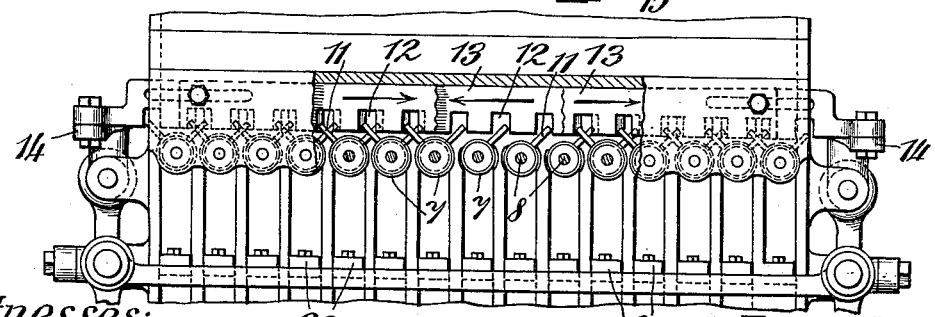

H. A. GSELL.
APPARATUS FOR MEASURING OFF MATCHES FOR MACHINES FOR PACKING MATCHES IN BOXES.
APPLICATION FILED DEC. 5, 1913.

1,096,299.

Patented May 12, 1914.
3 SHEETS—SHEET 3.

Witnesses:
B. Dommers
E. Leckert

Inventor:
Henry Alfred Gsell,
By
Atty.

UNITED STATES PATENT OFFICE.

HENRY ALFRED GSELL, OF PARIS, FRANCE.

APPARATUS FOR MEASURING OFF MATCHES FOR MACHINES FOR PACKING MATCHES IN BOXES.

1,096,299.	Specification of Letters Patent.	Patented May 12, 1914.

Application filed December 5, 1913. Serial No. 804,888.

*To all whom it may concern:*

Be it known that I, HENRY ALFRED GSELL, a citizen of the Republic of Switzerland, residing at Boulevard de Clichy 118, Paris, France, have invented new and useful Improvements in Apparatus for Measuring Off Matches for Machines for Packing Matches in Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements on the invention specified in my Patent No. 1,081,379, dated December 16, 1913. In my aforesaid patent there is described an apparatus for measuring off the matches for machines for packing matches in boxes, wherein spring slides or knives are pushed in between the matches in the longitudinal direction of the latter and coöperate with a fixed stop, in such a manner that they execute only toward the end of their longitudinal movement a slight transverse movement which is sufficient for closing said slides or knives. By the said invention there has been effected, compared to the arrangements previously employed, a considerable reduction of the space between the several compartments in which the matches are filled, so that the match magazine or charging receptacle situated above these compartments can be made much shorter.

The present invention has now for its object to construct and arrange the knives (inserted in the usual manner laterally between the matches) of a measuring off compartment for such machines, in such a manner that the said knives will not come into contact with the heads of the matches, and will require only a very small space for opening and closing, so that in spite of the lateral insertion of the knives, the considerable saving in space (effected by the aforesaid invention) between the several filling compartments is maintained, and the apparatus may also be used in combination with ordinary or non-safety matches.

Now according to the present invention, the knives which are arranged wholly inside the filling compartments are made of a circular arc shape or curved blade shape, and are moved in a circle of the same diameter as that to which the knives are curved. By this means, the thickness of the partitions between the several compartments may be reduced to a minimum, and disturbances in the working are obviated which are sometimes caused by the jamming of splinters in the slots for the insertion of the slides, which slots are usually provided in the said partitions, but which are dispensed with according to the present invention.

This invention may be carried out in various ways.

Some practical forms of the invention are illustrated by way of example in the accompanying drawings.

Figure 10:
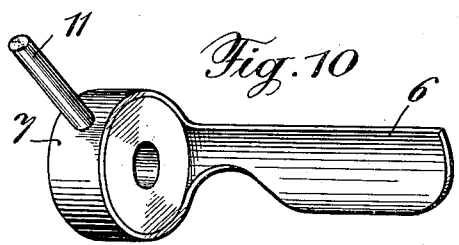
Figure 4:
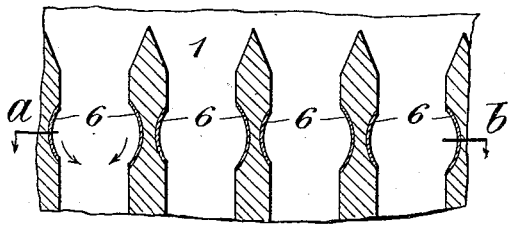
Figure 8:
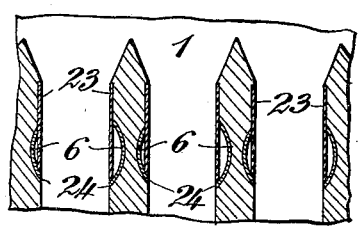
Figure 5:
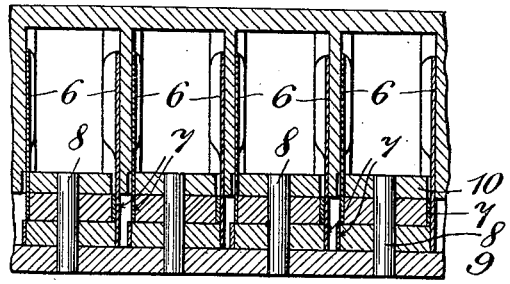
Figure 6:
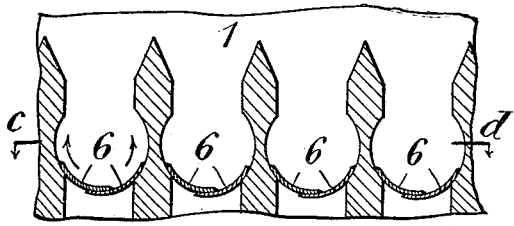
Figure 9:
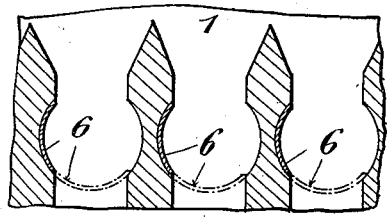
Figure 7:
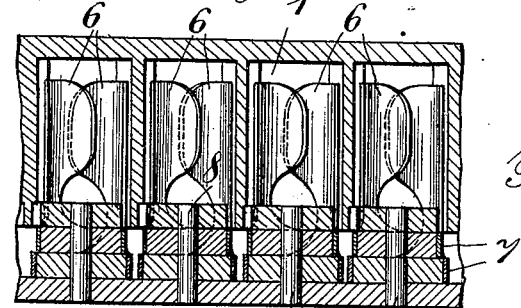

Figure 1 is a vertical section of a machine for packing matches in boxes provided with a measuring off apparatus constructed according to the present invention. Fig. 2 is a side elevation viewed from the left with reference to Fig. 1, of the sleeves provided on the measuring off knives and of the bars for their actuation. Fig. 3 is a plan view on Fig. 1. Fig. 4 is a vertical section on a larger scale of the filling compartments, showing the pairs of knives in the positions they occupy before the measuring off operation. Fig. 5 is a section on the line $a$—$b$ of Fig. 4 showing the knives in plan view. Fig. 6 is a vertical section corresponding to Fig. 4, showing the knives in the positions they occupy during the measuring off operation. Fig. 7 is a section on the line $c$—$d$ of Fig. 6, showing the knives in plan view. Figs. 8 and 9 show modifications of the apparatus, and Fig. 10 shows a perspective view of a measuring off knife.

As shown, 1 designates the match magazine in which the matches are arranged horizontally.

In order to measure off a determined number of matches for each match box, the filling piston 2 is moved into the position shown in Fig. 1. The rod of this piston 2 is connected to a part 3 which is moved up and down in a guide or track 3ª by means of a pivoted lever 4, which has its free end connected by a link 4ª to the part 3 and actuated by a cam disk 5. Measuring off knives 6 are arranged above the piston 2.

In the forms shown in Figs. 1 to 7, two such knives are provided in each filling compartment. These knives have a circular arc shape or curved blade shape (Fig. 10), and when closed they are situated partly one over the other (Figs. 6 and 7). These knives are moved in the compartments in a circle having a diameter corresponding to their curvature. For this purpose the rear portion of the knives is constructed in the form of a sleeve 7 (Fig. 10). The two sleeves 7 of a pair of knives of a filling compartment are arranged one behind the other in the manner shown in Figs. 1, 5 and 7, and they are pivoted on a fixed pin 8 between the parts 9 and 10.

Each sleeve 7 is provided with a radial pin 11 which projects in a corresponding groove 12 (Fig. 2) formed in a bar 13 situated above the sleeve 7. Two such bars 13 are arranged one behind the other (Fig. 3), of which each bar extends over all the sleeves situated in the same transverse planes. A lever 14 is pivoted to each of the mutually facing ends of the two bars 13. These levers 14 are arranged to pivot on fixed pins 15 (Fig. 3). Each lever 14 is formed with an oblique slot 16 in which projects a pin 17, of a bar 18. Bars 19 are pivotally connected to extensions of these bars 18 (Fig. 3), and these bars 19 are connected in a suitable manner to the cam disk 5 by means of rods.

The manner of operation of this apparatus is as follows: After the filling piston 2 has been moved into position in the usual manner, so that there are as many matches below the measuring knives as are intended to be contained in a match box, the bars 19 which are influenced by the cam 5, cause the bar 18 to move. In this movement the pins 17 engaging in the oblique slots 16 produce a rotation of the levers 14 on the pins 15 and consequently a longitudinal movement of the bars 13 in opposite directions, that is to say, toward each other. By means of the pins 8 which project in the grooves 12 of those oppositely moving bars 13, there is also produced a rotation of the knives 6 in the direction of the arrows shown in Fig. 4, so that then as is shown in Figs. 6 and 7, the pairs of knives of a filling compartment are situated partly over one another during the measuring off operation. The piston 2 now moves down as far as the plane 21, whereupon a second piston 22 conveys in the usual manner the matches which are situated on the filling piston 2, into the open boxes.

In the modification shown in Fig. 8, plates 23 are provided on both sides of the compartment walls of the filling compartments, behind which plates the knife parts 6 which project into these compartments are situated when the knives are in their positions before the measuring off operation. In this modification a narrow slot 24 must be provided for the passage of the knives 6 in the lower end of the plates 23 and the compartment wall.

As shown in Fig. 9 only one knife need be provided for each filling compartment if required.

Claims—

1. In an apparatus for measuring off matches for machines for filling matches into match boxes, a match magazine, circular arc shaped measuring off knives forming a bottom for said magazine in their closed position, means for moving said knives in a circle corresponding to the curved shape of the knives and a vertically movable plunger supporting the measured off matches.

2. In an apparatus for measuring off matches for machines for filling matches into match boxes, a match magazine, vertical partition walls dividing said magazine into a number of compartments, circular shaped grooves in said dividing walls, measuring off knives provided with a circular arc shaped blade arranged entirely within the filling compartment and with a sleeve-like rear portion, a radial pin provided on each sleeve-like knife part, means for moving said knives in a circle corresponding to the curved shape of the knives and a vertically movable plunger supporting the measured off matches.

3. In an apparatus for measuring off matches for machines for filling matches into match boxes, a match magazine, vertical partition walls dividing said magazine into a number of compartments, circular shaped grooves in said dividing walls, a pair of measuring off knives for each of said compartments, forming within the latter in their closed position a division wall, said knives being provided with a circular arc shaped blade arranged entirely within the filling compartments and with a sleeve like rear portion, the sleeves of each knife pair being arranged one behind the other, a radial pin provided on each of said sleeves, two bars provided with grooves above said pins and arranged one behind the other, levers pivoted to each of the mutually facing ends of the two bars, means for oscillating said levers in a horizontal plane and a vertically movable plunger supporting the measured off matches.

In testimony that I claim the foregoing as my invention, I have signed my name in presence of two subscribing witnesses.

HENRY ALFRED GSELL.

Witnesses:
 HANSON C. COXE,
 OSCAR SIDEMKASE.